United States Patent
Lapidus et al.

(10) Patent No.: US 6,300,268 B1
(45) Date of Patent: Oct. 9, 2001

(54) PROCESS FOR THE REACTIVATION OF SULFUR DEACTIVATED COBALT TITANIA CATALYSTS

(75) Inventors: Albert L'Vovich Lapidus, Kashirskoje (RU); Michel A. Daage; Russell J. Koveal, both of Baton Rouge, LA (US); Alla Jurievna Krylova; Anatoliy B. Erofeev, both of Moscow (RU)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/393,517

(22) Filed: Sep. 10, 1999

(51) Int. Cl.⁷ .............................. B01J 38/10; B01J 38/12; B01J 38/48
(52) U.S. Cl. .................................. 502/38; 502/22; 502/53
(58) Field of Search ................................. 502/22, 38, 53; 518/709

(56) References Cited

U.S. PATENT DOCUMENTS

| | | | |
|---|---|---|---|
| 3,661,798 | * | 5/1972 | Cosyns et al. . |
| 4,663,305 | * | 5/1987 | Mauldin et al. . |
| 4,977,126 | * | 12/1990 | Mauldin et al. . |
| 5,880,050 | * | 3/1999 | Boitiaux et al. . |

* cited by examiner

Primary Examiner—Steven P. Griffin
Assistant Examiner—Christina Ildebrando
(74) Attorney, Agent, or Firm—Jay Simon; Charles J. Brumlik

(57) ABSTRACT

A process for the desulfurization, and reactivation of a sulfur deactivated catalyst constituted of cobalt composited with a titania support. The sulfur deactivated cobalt titania catalyst is first contacted with a gaseous stream of molecular oxygen at temperature sufficiently high to oxidize the sulfur component of the catalyst. The sulfur oxidized catalyst is next contacted with a liquid, preferably water, to remove the oxide, or oxides of the sulfur. The catalyst is then contacted with a reducing agent, suitably hydrogen, to restore the activity of the catalyst. During the treatment there is no substantial loss, if any, of cobalt from the catalyst.

9 Claims, No Drawings

PROCESS FOR THE REACTIVATION OF SULFUR DEACTIVATED COBALT TITANIA CATALYSTS

1. FIELD OF THE INVENTION

This invention relates to a process for the reactivation, or regeneration of cobalt catalysts deactivated by sulfur; particularly cobalt catalysts as used in hydrogenation of carbon monoxide or Fischer-Tropsch reactions. It also relates to cobalt-titania catalysts, to the process utilizing the catalyst, and the products of such process.

2. BACKGROUND

Fischer-Tropsch (F-T) reactions, i.e., catalytic reactions for the production of $C_5+$ liquid hydrocarbons from mixtures of hydrogen and carbon monoxide, are well known. The F-T process has become the subject of intense study for commercial development. The catalysts used in conducting F-T reactions are typically constituted of an Iron Group metal (Periodic Table of the Elements, Sargent-Welch Scientific Company, Copyright 1979) of Group VIII, e.g., iron, nickel or cobalt, distributed on a particulate refractory inorganic oxide support, e.g., titania. In formation of the catalyst, the catalytic properties of the Iron Group metal may be modified or promoted by an additional metal, or metals, from Group VIIB or VIII, e.g., platinum or rhenium.

In conducting an F-T synthesis reaction, a synthesis gas constituting a mixture of hydrogen and carbon monoxide is reacted over an Iron Group metal catalyst, e.g., $Co$—$Re/TiO_2$, to produce a $C_5+$ waxy hydrocarbon product which is separated into various fractions for further processing into transportation fuels, distillates, diesel and jet fuels, solvents and lubricating oils. While the waxy products from the F-T reactor are generally referred to as essentially "non-sulfur" containing compounds, the presence of sulfur in even a few parts, per million parts by weight (wppm) of a product, has been found to cumulatively poison a cobalt-containing catalyst and shorten its life. It thus becomes necessary for the viability of the process to periodically reactivate, or regenerate the sulfur deactivated catalyst.

Where the reaction product mixture in contact with the catalyst contains even a small amount of sulfur, the catalyst is cumulatively poisoned by the deposited sulfur. The result: All too soon the catalyst must be reactivated, or regenerated, by removal of the sulfur. Whereas methods are known for reactivating cobalt catalysts, such techniques often result in the removal of cobalt along with the sulfur. The result: All too soon the catalyst must be reworked, and replaced.

In U.S. Pat. No. 3,661,798, which issued May 9, 1972 to Institut Francais du Petrole, e.g., there is described a method wherein a sulfur-deactivated cobalt/silica catalyst is regenerated by the successive steps of heating the deactivated catalyst with a gas containing molecular oxygen at 300 to 600° C., contacting the cooled catalyst with water at about 0 to 250° C., and then with hydrogen at about 200 to 500° C. The regeneration is not successfully reactivated when the carrier component of the catalyst is alumina. Moreover, it has been found that cobalt is extracted and lost from the catalyst even when the carrier component for the cobalt is silica. Accordingly, there remains a need for better methods, or processes for reactivating, or regenerating cobalt-containing catalysts.

3. THE INVENTION

This need and others is achieved in accordance with the present invention which embodies, in the preparation of a cobalt catalyst, compositing cobalt with titania sufficient that when the catalyst is sulfided and deactivated by sulfur, or sulfur-bearing compounds, it can be reactivated, or regenerated, without significant loss of cobalt, if any, from the catalyst. The reactivation, or regeneration is accomplished by treating the sulfided cobalt titania catalyst in a series of steps requiring (1) contact, and treatment, with a gaseous stream of molecular oxygen, preferably air, or oxygen-enriched air or nitrogen, at temperature ranging from about 150° C. to about 600° C., preferably from about 300° C. to about 500° C., sufficient to oxidize the sulfur component (and metal component) of the catalyst, and then (2) contacting, treating or washing the sulfur oxidized catalyst, in situ or ex situ of the reaction zone in which Step (1) was conducted, with a liquid, preferably water, at temperature ranging from about 0° C. to about 100° C., preferably from about 20° C. to about 80° C., sufficient to remove the oxide, or oxides of sulfur. The catalyst is then contacted with hydrogen, or other reducing agent, to reduce the metal, or metals, or oxide of the metal, or metals, component to restore the activity of the catalyst, as measured by CO hydrogenation after reduction of the catalyst. It has been found that the activity, and selectivity of a cobalt-titania catalyst, e.g., a cobalt-rhenium-titania catalyst, sulfur deactivated and used in an F-T synthesis reaction, on reactivation, or regeneration in this manner can be restored to that of the fresh catalyst originally used for conducting the similar operation.

The catalysts of this invention can be prepared by techniques known in the art for the preparation of hydrocarbon synthesis, or F-T catalysts. The catalyst can, e.g., be prepared by gelation, or cogelation techniques. Preferably however the cobalt metal, and if desired a promoter metal, or metals, can be deposited on a previously pilled, pelleted, beaded, extruded, or sieved titania support material by the impregnation method. In preparing catalysts, the metals are deposited from solution on the support in preselected amounts to provide the desired absolute amounts, and weight ratio of the metal or metals being deposited. Suitably, the cobalt by itself, or promoter, if a promoter is desired, are composited with the support by serially contacting the support with a solution of a cobalt-containing compound, or salt, and a solution containing the promoter-containing compound, or salt, respectively. Optionally, the cobalt and promoter can be co-impregnated upon the support. The cobalt and promoter compounds used in the impregnation can be any organometallic or inorganic compounds which when reduced in hydrogen forms water or which can be converted to the corresponding oxide, which when reduced in hydrogen forms water, such as a cobalt nitrate, acetate, acetylacetonate, naphthenate, or the like. The nitrate is preferred for cobalt. The amount of impregnation solution used should be sufficient to completely immerse the carrier, usually within the range from about 1 to 20 times of the carrier by volume, depending on the metal, or metals concentration in the impregnation solution. The impregnation treatment can be carried out under a wide range of conditions including ambient or elevated temperatures.

Rhenium, cerium, hafnium, and uranium are preferred promoters, and can be included with cobalt in forming the catalyst. Usually, these materials are present in a weight ratio to cobalt of at least about 0.05:1, preferably at least about 0.1:1, and may range from about 0.1:1 to about 1:1, but the promoter is usually present in an amount less than the cobalt. Rhenium is a particularly preferred promoter and may be deposited onto the support as perrhenic acid. The amount of cobalt employed is at least that which is catalytically effective, e.g., at least about 2 parts, per 100 parts by weight of catalyst (dry basis), i.e., 2 wt. %. However, cobalt concentrations may range from about 2 wt. % to about 70 wt. %, preferably from about 10 wt. % to about 30 wt. %. The carrier, or support component of the catalyst is constituted of at least 30 wt. % titania, and preferably at least about 70 wt. % titania.

When the catalyst comes in contact with sulfur, the activity of the catalyst gradually declines; eventually to such point that it is not economically sound to continue the operation without a new, or reactivated catalyst. The catalyst, at this point, is discharged from the F-T reaction zone and treated (1) to oxidize the sulfur component of the catalyst. Then the oxidized sulfur catalyst is treated by (2) washing with water to remove the oxidized sulfur component from the catalyst. The catalyst is then reduced, and the catalyst thereby activated. Step (1), is conducted by contact of the sulfided catalyst with a gaseous stream at high temperature, ranging from about 150° C. to about 600° C., preferably about 300° C. to about 500° C., for a period of time, generally from about 1 hour to about 5 hours, sufficient to essentially completely oxidize the sulfur. The oxides of sulfur are then removed, and the activity, and selectivity, of the catalyst restored by contact, and washing with water of temperature ranging from about 0° C. to about 100° C., preferably from about 20° C. to about 80° C.

The catalyst, after washing, may be dried by heating at temperature above about 30° C., preferably between 30° C. and 125° C., in the presence of nitrogen, oxygen, hydrogen, or air, in a gas stream or under vacuum. Subsequent to drying the metal, or metals, or oxide of the metal, or metals, component may be reduced and activated with a hydrogen or hydrogen containing gas stream.

Reduction/activation of the catalyst is effected in hydrogen or a hydrogen containing gas stream at temperatures above about 250° C., preferably from about 250° C. to about 550° C., and more preferably from about 275° C. to about 425° C., generally for periods ranging from about 0.5 to about 24 hours and at pressures ranging from above ambient to about 40 atmospheres, supra.

Regeneration and reactivation of the catalyst in this manner produces a catalyst of increased activity, and selectivity in the production of high melting wax via F-T synthesis.

Hydrocarbon Synthesis

In conducting the preferred Fischer-Tropsch, or F-T synthesis reaction, a mixture of hydrogen and carbon monoxide is reacted over an Iron Group metal catalyst, e.g., a cobalt or ruthenium catalyst, to produce a waxy product which can be separated in various fractions, suitably a heavy or high boiling fraction and a lighter or low boiling fraction, nominally a 700° F.+ (372° C.+) reactor wax and a 700° F.− (372° C.−) fraction. The latter, or 700° F.− (372° C.−) fraction, can be separated into (1) a F-T Cold separator liquid, or liquid nominally boiling within a range of about $C_5$-500° F. (260° C.), and (2) a F-T hot separator liquid, or liquid nominally boiling within a range of about 500° F.–700° F. (260° C.–372° C.). (3) The 700° F.+ (272° C.+) stream, with the F-T cold and hot separator liquids, constitute raw materials useful for further processing.

The F-T synthesis process is carried out at temperatures of about 160° C. to about 325° C., preferably from about 190° C. to about 260° C., pressures of about 5 atm to about 100 atm, preferably about 10–40 atm and gas hourly space velocities of from about 300 V/Hr/V to about 20,000 V/Hr/V, preferably from about 500 V/Hr/V to about 15,000 V/Hr/V. The stoichiometric ratio of hydrogen to carbon monoxide in the synthesis gas is about 2.1:1 for the production of higher hydrocarbons. However, the $H/CO_2$ ratios of 1:1 to about 4:1, preferably about 1.5:1 to about 2.5:1, more preferably about 1.8:1 to about 2.2:1 can be employed. These reaction conditions are well known and a particular set of reaction conditions can be readily determined by those skilled in the art. The reaction may be carried out in virtually any type reactor, e.g., fixed bed, moving bed, fluidized bed, slurry, bubbling bed, etc. The waxy or paraffinic products from the F-T reactor are essentially non-sulfur, non-nitrogen, non-aromatics containing hydrocarbons. This is a liquid product which can be produced and shipped from a remote area to a refinery site for further chemically reacting and upgrading to a variety of products, or produced and upgraded to a variety of products at a refinery site. For example, the hot separator and cold separator liquids, respectively, $C_4$–$C_{15}$ hydrocarbons, constitute high quality paraffin solvents which, if desired can be hydrotreated to remove olefin impurities, or employed without hydrotreating to produce a wide variety of wax products. The reactor wax, or $C_{16}$+ liquid hydrocarbons from the F-T reactor, on the other hand, can be upgraded by various hydroconversion reactions, e.g., hydrocracking, hydroisomerization, catalytic dewaxing, isodewaxing, reforming, etc. or combinations thereof, to produce (i) fuels, i.e., such as stable, environmentally benign, non-toxic mid-distillates, diesel and jet fuels, e.g., low freeze point jet fuel, high cetane jet fuel, etc., (ii) lubes, or lubricants, e.g., lube oil blending components and lube oil base stocks suitable for transportation vehicles, (iii) chemicals and specialty materials, e.g., non-toxic drilling oils suitable for use in drilling muds, technical and medicinal grade white oils, chemical raw materials, monomers, polymers, emulsions, isoparaffinic solvents, and various specialty products.

(I) Maximum Distillate

Option A:

The reactor wax, or 700° F.+ (372° C.+) boiling fraction from the F-T reactor, with hydrogen, is passed directly to a hydroisomerization reactor, HI, operated at the following typical and preferred HI reaction conditions, to wit:

| HI Reactor Conditions | Typical Range | Preferred Range |
|---|---|---|
| Temperature, ° F. (° C.) | 300–800 (148–427) | 550–750 (286–398) |
| Total Pressure, psig | 0–2500 | 300–1200 |
| Hydrogen Treat Rate, SCF/B | 500–5000 | 2000–4000 |

While virtually any catalyst useful in hydroisomerization or selective hydrocracking may be satisfactory for this operation, some catalysts perform better than others. For example, catalysts containing a supported Group VIII noble metal, e.g., platinum or palladium, are particularly useful as are catalysts containing one or more Group VIII base metals, e.g., nickel, cobalt, in amounts of about 0.5–20 wt %, which may or may not also include a Group VI metal, e.g., molybdenum, in amounts of about 1–20 wt %. The support for the metals can be any refractory oxide or zeolite or mixtures thereof. Preferred supports include silica, alumina, silica-alumina, silica-alumina phosphates, titania, zirconia, vanadia and other Group III, IV, VA or VI oxides, as well as Y sieves, such as ultrastable Y sieves. Preferred supports include alumina and silica-alumina where the silica concentration of the bulk support is less than about 50 wt %, preferably less than about 35 wt %. A preferred catalyst has a surface area in the range of about 180–400 $m^2$/gm, preferably 230–350 m²/gm, and a pore volume of 0.3 to 1.0 ml/gm, preferably 0.35 to 0.75 ml/gm, a bulk density of about 0.5–1.0 g/ml, and a side crushing strength of about 0.8 to 3.5 kg/mm.

The preferred catalysts comprise a non-noble Group VIII metal, e.g., iron, nickel, in conjunction with a Group IB metal, e.g., copper, supported on an acidic support. The support is preferably an amorphous silica-alumina where the alumina is present in amounts of less than about 30 wt %, preferably 5–30 wt %, more preferably 10–20 wt %. Also, the support may contain small amounts, e.g., 20–30 wt %, of a binder, e.g., alumina, silica, Group IVA metal oxides, and various types of clays, magnesia, etc., preferably alumina. The catalyst is prepared by coimpregnating the metals from solutions onto the support, drying at 100–150° C., and calcining in air at 200–550° C.

The preparation of amorphous silica-alumina microspheres for supports is described in Ryland, Lloyd B., Tamele, M. W., and Wilson, J. N., Cracking Catalysts, Catalysis: Volume VII, Ed. Paul H. Emmett, Reinhold Publishing Corporation, New York, 1960, pp. 5–9.

The Group VIII metal is present in amounts of about 15 wt % or less, preferably 1–12 wt %, while the Group IB metal is usually present in lesser amounts, e.g., 1:2 to about 1:20 ratio respecting the Group VIII metal. A typical catalyst is shown below:

| | |
|---|---|
| Ni, wt % | 2.5–3.5 |
| Cu, wt % | 0.25–0.35 |
| $Al_2O_3$—$SiO_2$ | 65–75 |
| $Al_2O_3$(binder) | 25–30 |
| Surface Area | 290–355 m²/gm |
| Pour Volume (Hg) | 0.35–0.45 ml/gm |
| Bulk Density | 0.58–0.68 g/ml |

The 700° F.+ (372° C.+) conversion to 700° F.− (372° C.−) in the hydroisomerization unit ranges from about 20–80%, preferably 20–50%, more preferably about 30–50%. During hydroisomerization essentially all olefins and oxygen containing materials are hydrogenated.

In a preferred option, both the cold separator liquid, i.e., the $C_5$-500° (260° C.) boiling fraction, and the hot separator liquid, i.e., the 500° F.–700° F. (260° C.–372° C.) boiling fraction, are hydrotreated in a hydrotreated reactor, H/T, at hydrotreating conditions, the H/T product is combined with the HI product, and passed to a fractionator. The following describes the typical and preferred H/T reaction conditions, to wit:

| H/T Conditions | Typical Range | Preferred Range |
|---|---|---|
| Temperature, ° F. (° C.) | 200–750 (94–398) | 350–600 (175–315) |
| Total Pressure, psig | 100–1500 | 300–750 |
| Hydrogen Treat Rate, SCF/B | 100–5000 | 500–1500 |

Suitable hydrotreating catalysts include those which are comprised of at least one Group VIII metal, preferably Fe, Co and Ni, more preferably Co and/or Ni, and most preferably Ni; and at least one Group VI metal, preferably Mo and W, more preferably Mo, on a high surface area support material, preferably alumina. Other suitable hydrotreating catalysts include zeolitic catalysts, as well as noble metal catalysts where the noble metal is selected from Pd and Pt. One, or more than one type of hydrotreating catalyst may be used in the same bed. The Group VIII metal is typically present in an amount ranging from about 2 to 20%, preferably from about 4 to 12%, based on the total weight of the catalyst (wt. %, dry basis). The Group VI metal will typically be present in an amount ranging from about 5 to 50 wt. %, preferably from about 10 to 40 wt. %, and more preferably from about 20 to 30 wt. %.

Gas and $C_5$-250° F. (121° C.) condensate streams are recovered from the fractionator. After separation and removal of the $C_5$-250° F. (121° C.) material, a 250° F.–700° F.− (121° C.–372° C.−) diesel fuel or diesel fuel blending component is recovered from the fractionator. A 700° F.+ (372° C.+) product component that is recovered is suitable as a lube or lube oil blending component.

The diesel material recovered from the fractionator has the properties shown below:

paraffins at least 95 wt %, preferably at least 96 wt %, more preferably at least 97 wt %, still more preferably at least 98 wt %, and most preferably at least 99 wt %; iso/normal ratio about 0.3 to 3.0, preferably 0.7–2.0; sulfur 50 ppm (wt), preferably nil; nitrogen 50 ppm (wt), preferably 20 ppm, more preferably nil; unsaturates 2 wt %; (olefins and aromatics) oxygenates about 0.001 to less than 0.3 wt % oxygen water-free basis.

The iso paraffins which are present are largely mono methyl branched, and the product contains nil cyclic paraffins, e.g., no cyclohexane.

The 700° F.− (372° C.−) fraction is rich in oxygenates, and e.g., 95% of the oxygenates, are contained in this lighter fraction. Further, the olefin concentration of the lighter fraction is sufficiently low as to make olefin recovery unnecessary; and further treatment of the fraction for olefins is avoided.

These diesel fuels generally have the properties of high cetane number, usually 50 or higher, preferably at least about 60, more preferably at least about 65, lubricity, oxidative stability, and physical properties compatible with diesel pipeline specifications.

The product can be used as a diesel fuel per se or blended with other less desirable petroleum or hydrocarbon containing feeds of about the same boiling range. When used as a blend, the product can be used in relatively minor amounts, e.g., 10% or more for significantly improving the final blended diesel product.

Although, this material will improve almost any diesel product, it is especially useful in blending with refinery diesel streams of low quality. Typical streams are raw or hydrogenated catalytic or thermally cracked distillates and gas oils.

Option B:

Optionally, the cold separator liquid and hot separator liquid is not subjected to any hydrotreating. In the absence of hydrotreating of the lighter fractions, the small amount of oxygenates, primarily linear alcohols, in this fraction can be preserved, though oxygenates in the heavier reactor wax fraction are eliminated during the hydroisomerization step. Hydroisomerization serves to increase the amount of iso-paraffins in the distillate fuel and helps the fuel to meet pour point and cloud point specifications, although additives may be employed for these purposes.

The oxygen compounds that are believed to promote lubricity may be described as having a hydrogen bonding energy greater than the bonding energy of hydrocarbons (the energy measurements for various compounds are available in standard references); the greater the difference, the greater the lubricity effect. The oxygen compounds also have a lipophilic end and a hydrophilic end to allow wetting of the fuel.

Preferred oxygen compounds, primarily alcohols, have a relatively long chain, i.e., $C_{12}+$, more preferably $C_{12}$–$C_{24}$ primary linear alcohols.

The amount of oxygenates present is rather small, but only a small amount of oxygenates as oxygen on a water free basis is needed to achieve the desired lubricity, i.e., at least about 0.001 wt % oxygen (water free basis), preferably 0.001–0.3 wt % oxygen (water free basis), more preferably 0.0025–0.3 wt % oxygen (water free basis).

Option C:

As a further option, all or preferably a portion of the cold separator liquid can be subjected to hydrotreating while the hot separator liquid and the reactor is hydroisomerized; the wider cut hydroisomerization eliminating the fractionator vessel. However, the freeze point of the jet fuel product is compromised to some extent. Preferably, the $C_5$-350° F. (175° C.) portion of the cold separator liquid is hydrotreated, while the 350° F.+ (175° C.+) material is blended with the hot separator liquid and the reactor wax and hydroisomerized. The product of the HI reactor is then blended with the hydrotreated $C_5$-350° F. (175° C.) product and recovered.

Option D:

In a fourth option, a split-feed flow scheme is provided which can produce a jet fuel capable of meeting a jet A-1 freeze point specification. In this option, the hot separator liquid and the reactor wax is hydroisomerized and the product recovered. The cold separator liquid, and optionally any residual 500° F.– (260° C.–) components after subjecting the hot separator liquid and reactor wax to treatment in a wax fractionator prior to hydroisomerization, is subjected to hydrotreating. The hydrotreated product is separated into a (a) $C_5$-350° F. (175° C.) product which is recovered, and a 350° F.+ (175° C.) product which is hydroisomerized and the hydroisomerized product then also recovered. These products can be blended together to form a jet fuel meeting a jet A-1 freeze point specification.

(II) Production of Maximum Diesel

The three streams from the F-T reactor constituting the syncrude, viz. 1) the cold separator liquid ($C_5$-500° F.), 2) hot separator liquid (500° F–700° F.), and 3) reactor wax (700° F.+) are each treated in accordance with certain options for producing the maximum amount of a diesel fuel as follows:

Option A: (Single Reaction Vessel: Wax Hydroisomerizer)

The reactor wax from the F-T reactor is passed, with hydrogen, to a wax hydroisomerizer. The other two streams from the F-T reactor, i.e., the cold separator liquid and the hot separator liquid, are combined with the product from the hydroisomerizer, and the total mixture is passed to a fractionation column where it is separated into light gases, naphtha, and a 700° F.– (372° C.–) distillate while a 700° F.+ (372° C.+) stream is recycled to extinction in the hydroisomerizer.

The catalysts used to conduct the wax hydroisomerization reaction are described in subsection (I) Maximum Distillate, Option A.

The conditions employed for conducting the wax hydroisomerization reaction are described in subsection (I) Maximum Distillate, Option A.

Option B: (Two Vessel System: Wax Hydroisomerizer and Hydrotreater)

In this Option B, the reactor wax treating scheme described for maximum diesel in accordance with option A is unchanged, but in this instance both the cold separator liquid and hot separator liquid are hydrotreated at hydrotreating conditions, the product therefrom is then mixed with the product of the wax hydroisomerizer, and the total mixture fractionated to recover light gases, naphtha and distillate.

The hydrotreating catalyst used in conducting the hydrogenation reaction is described in subsection (I) Maximum Distillate, Option A.

The conditions employed in conducting the hydrotreating reaction is described in subsection (I) Maximum Distillate, Option A.

Option C: (One Vessel: A Wax Hydroisomerizer)

In accordance with this option, both the cold separator liquid and the reactor wax are hydroisomerized, the hot separator liquid is mixed with the product from the hydroisomerizer, and the total mixture is passed to a fractionater where it is separated into light gases, naphtha and distillate. A 700° F.+ (372° C.+) fraction is recycled to extinction in the wax hydroisomerizer.

The catalyst used to conduct the wax hydroisomerization reaction is described in subsection (I) Maximum Distillate, Option A.

The conditions employed in conducting the hydroisomerization reaction is described in subsection (I) Maximum Distillate, Option A.

(III) Production of Maximum Lube (Two reaction vessels; a Hydroisomerizer and a Catalytic Dewaxing Unit)

The reactor wax, or 700° F.+ boiling fraction, and the hot separator liquid, or 500° F.–700° F. boiling fraction, from the F-T reactor are reacted in a hydroisomerizer and the product therefrom passed to a fractionator column wherein it is split into $C_1$–$C_4$ gases, naphtha, distillate and a 700° F.+ fraction.

The 700° F.+ fraction is dewaxed, preferably in a catalytic dewaxing unit, or is both catalytically dewaxed and the product then subjected to a low vacuum distillation, or fractionation, to produce a lubricant, or lubricants. The lubricant, or lubricants, is of high viscosity index and low pour point, and is recovered in high yield.

In conducting the hydroisomerization step, the feed, at least 50 percent, more preferably at least 70 percent, of which boils above 700° F., with hydrogen, is contacted and hydroisomerized over a hydroisomerization catalyst at hydroisomerization conditions sufficient to convert from about 20 percent to about 50 percent, preferably from about 30 to about 40 percent, of the 700° F.+ hydrocarbons of the feed to 700° F.– products, based on the weight of the total feed. At these conversion levels, major amounts of the n-paraffins are hydroisomerized, or converted to isoparaffins, with minimal hydrocracking to gas and fuel by-products.

The total feed to the hydroisomerization reactor, which constitutes from about 20 percent to about 90 percent, preferably from about 30 percent to about 70 percent, by weight of the total liquid output from the F-T reactor, is fed, with hydrogen, into the hydroisomerization reactor. The hydroisomerization reactor contains a bed of hydroisomerization catalyst with which the feed and hydrogen are contacted; the catalyst comprising a metal hydrogenation or dehydrogenation component composited with an acidic oxide carrier, or support. In the hydroisomerization reactor, the feed introduced thereto is thus converted to isoparaffins and lower molecular weight species via hydroisomerization.

The hydrogenation or dehydrogenation metal component of the catalyst used in the hydroisomerization reactor may be any Group VIII metal of the Periodic Table of the Elements. Preferably the metal is a non-noble metal such as cobalt or nickel; with the preferred metal being cobalt. The catalytically active metal may be present in the catalyst together with one or more metal promoters or co-catalysts. The promoters may be present as metals or as metal oxides, depending upon the particular promoter. Suitable metal oxide promoters include oxides of metals from Group VI of the Periodic Table of the Elements. Preferably, the catalyst contains cobalt and molybdenum. The catalyst may also contain a hydrocracking suppressant since suppression of the cracking reaction is necessary. The hydrocracking suppressant may be either a Group IB metal or a source of sulfur, usually in the form of a sulfided catalytically active metal, or a Group IB metal and a source of sulfur.

The acidic oxide carrier component of the hydroisomerization catalyst can be furnished by a support with which the catalytic metal or metals can be composited by well known methods. The support can be any acidic oxide or mixture of oxides or zeolites or mixtures thereof. Preferred supports include silica, alumina, silica-alumina, silica-alumina-phosphates, titania, zirconia, vanadia and other Group III, IV, V or VI oxides, as well as Y sieves, such as ultra stable Y sieves. Preferred supports include alumina and silica-alumina, more preferably silica-alumina where the silica concentration of the bulk support is less than about 50 wt. %, preferably less than about 35 wt. %. Most preferably the concentration ranges from about 15 wt. % to about 30 wt. %. When alumina is used as the support, small amounts of chlorine or fluorine may be incorporated into the support to provide the acid functionality.

A preferred supported catalyst is one having surface areas in the range of about 180 to about 400 $m^2/gm$, preferably about 230 to about 350 $m^2/gm$, and a pore volume of about 0.3 to about 1.0 mL/gm, preferably about 0.35 to about 0.75 mL/gm, a bulk density of about 0.5 to about 1.0 g/mL, and a side crushing strength of about 0.8 to about 3.5 kg/mm.

The preparation of preferred amorphous silica-alumina micropheres for use as supports is described in Ryland, Lloyd B., Tamele, M. W., and Wilson, J. N., Cracking Catalysts, Catalysis; Volume VII, Ed. Paul H. Emmett, Reinhold Publishing Corporation, New York, 1960.

The hydroisomerization reactor is operated at conditions defined as follows:

| Major Operating Variables | Typical | Preferred |
|---|---|---|
| Temperature, ° C. | 200–450 | 290–400 |
| Pressure, psig | 300–10,000 | 500–1500 |
| Hydrogen Treat Rate, SCF/B | 500–5000 | 1000–4000 |

During hydroisomerization, the amount of conversion of the 700° F.+ to 700° F.− is critical, and ranges from about 20 percent to about 50 percent, preferably from about 30 to about 40 percent; and at these conditions essentially all olefins and oxygenated products are hydrogenated.

The 700° F.+ fraction from the bottom of the fractionation column is passed to a catalytic dewaxing unit wherein the waxy lubricant molecules are subjected to a pour point reducing step to produce final or near-final lubricants; some of which may require further separation in a lube vacuum pipe still. Thus, a lubricant from the catalyst dewaxing unit can be passed to a low vacuum pipe still for further concentration of lube molecules into a final product.

The final pour point reducing step in the catalyst dewaxing unit is preferably carried out by contact with a unitized mixed powder pellet catalyst comprising a dehydrogenation component, a dewaxing component, and an isomerization component. The dehydrogenation component is a catalytically active metal, or metals, comprising a Group VIB, VIIB or Group VIII metal of the Periodic Table of the Elements. The dewaxing component is comprised of an intermediate or small pore crystalline zeolite, and the isomerization component is constituted of an amorphous acidic material. Such catalyst not only produces lubricants with high viscosity indexes and significantly reduced pour points but reduced yields of undesirable gas and naphtha.

Catalytic dewaxing is a process well documented in the literature; as are catalysts useful in such processes. However, the preferred catalysts employed in the catalytic dewaxing unit are unitized mixed powder pellet catalysts characterized as particulate solids particles made by mixing together a powdered molecular sieve dewaxing component and a powdered amorphous isomerization component, one or both components of which, preferably both, contains a dehydrogenation component, or components, (or to which is subsequently added a dehydrogenation component, or components), forming a homogeneous mass from the mixture, and pelletizing the mass to produce solids particles, or pellets, each of which contains the dewaxing component, the isomerization component, and the dehydrogenation component in intimate admixture; or contains the dewaxing component and the isomerization component to which is added the dehydroisomerization component, or components, to form particulate solids wherein the dewaxing component, the isomerizing component, and hydrogenation components are present in intimate mixture. The components of the catalyst work together, cooperatively and synergistically, to selectively crack and convert the n-paraffins, or waxy components of the feed, to produce reaction products which are removed from the process as gas, while allowing branched hydrocarbons to pass downstream for removal as useful lube oil blending components, and lube oil products. This catalyst permits the conversion of Fischer-Tropsch reaction products to upgraded products from which lubricants of high viscosity index and low pour point can be recovered. This objective, and others, is achieved while minimizing the production of the less desirable gas and naphtha.

In preparation of the unitized powder pellet catalyst, the catalytic metal, or metals, dehydrogenation component can be composited with the dewaxing component, or the catalyst metal, or metals, dehydrogenation component can be composited with the isomerization component, or the catalytic metal, or metals, dehydrogenation component can be composited with both the dewaxing and the isomerization components prior to formation of the unitized powder pellet catalyst. The unitized powder pellet catalyst can also be formed from a composite of the dewaxing and isomerization components and a catalytic metal, or metals, dehydrogenation component can then be deposited thereon. Suitably, the dehydrogenation component is a Group VIB, Group VIIB, or Group VIII metal, or metals, preferably a Group VIII noble metal, or metals, of the Periodic Table of the Elements (Sargent-Welch Scientific Company: Copyright 1968), suitably ruthenium, rhodium, palladium, osmium, iridium and platinum. Suitably, the catalytic metal, or metals, dehydrogenation component is present in concentration ranging from about 0.1 percent to about 5.0 percent, preferably from about 0.1 percent to about 3.0 percent, based on the weight of the total catalyst (dry basis). In general, the molecular sieve component is present in the catalyst in concentrations ranging from about 2 percent to about 80 percent, preferably from about 20 percent to about 60 percent, based on the weight of the catalyst (dry basis). The isomerization component is generally present in concentration ranging from about 20 percent to about 75 percent, preferably from about 30 percent to about 65 percent, based on the weight of the catalyst (dry basis).

The dewaxing component of the unitized powder pellet catalyst is preferably an intermediate pore, or a small pore size molecular sieve, or zeolite. A preferred molecular sieve dewaxing component is an intermediate pore size zeolite having a 10 membered ring unidirectional pore material which has oval 1-D pores having a minor axis between 4.2 Å and 4.8 Å and a major axis between 5.4 Å and 7.0 Å as determined by X-ray crystallography.

A yet more preferred dewaxing component used to form the unitized powder pellet catalyst is characterized as a small pore molecular sieve wherein the pore windows are formed by 8 oxide atoms that form the limiting edge of this pore window. The oxide atoms each constitute one of the four oxide atoms of a tetrahedrally coordinated cluster around a silicon or aluminum ion, called a framework ion or atom. Each oxide ion is coordinated to two framework ions in these structures. The structure is referred to as "8 ring" as a shorthand way of describing a more complex structure; a shorthand notation used extensively in describing molecular sieves of this type is the *Atlas Of Zeolite Structure Types,* Fourth Revised Edition 1996 in 8 Zeolites 17:1–230, 1996. Pores of this size are such as to substantially exclude molecules of larger size than normal hexane; or, conversely, to allow entry into the pores of molecules of smaller size than normal hexane. The small pore molecular sieve is of pore size ranging between about 6.3 Å and 2.3 Å, preferably about 5.1 Å to about 3.4 Å, and comprised of a crystalline tetrahedral framework oxide component. It is preferably selected from the group consisting of zeolites, tectosilicates, tetrahedral aluminophosphates and tetrahedral silicoaluminophosphates (SAPOs). Exemplary of the molecular sieve components of this type are SAPO-56, (AFX), ZK-5 (KFI), $AlPO_4$-25 (ATV), Chabazite (CHA), TMA-E (EAB), Erionite (ERI), and Linde Type A (LTA). The Linde Type A zeolite is a particularly preferred molecular sieve.

The catalysts, besides the dewaxing, isomerization, and dehydrogenated components, may optionally also contain binder materials. Exemplary of such binder materials are silica, alumina, silica-alumina, clays, magnesia, titania, zirconia or mixtures of these with each other or with other materials. Silica and alumina are preferred, with alumina being the most preferred binder. The binder, when present, is generally present in amount ranging from about 5 percent to about 50 percent, preferably from about 20 percent to about 30 percent, based on the weight of the total catalyst (dry basis; wt. %).

The unitized catalyst can be prepared by pulverizing and powdering and then mixing together a powdered finished molecular sieve catalyst and a powdered finished isomerization catalyst, as components, and then compressing the homogeneous mass to form particulate solid shapes, e.g., lumpy solid shapes, extrudates, beads, pellets, pills, tablets or the like; each solid shape of which contains the molecular sieve dewaxing component, the isomerization component and the dehydrogenation component. One or more catalysts of given type can be pulverized and powdered, and mixed to provide a necessary component, or components, of the unitized mixed pellet catalyst. For example, a molecular sieve catalyst can supply the dewaxing and dehydrogenating functions, to wit: a molecular sieve component composited with, preferably by impregnation, a Group VIII metal, or metals, of the Periodic Table, most preferably a Group VIII noble metal, or metals, e.g., platinum or palladium. Generally, the catalyst is impregnated with from about 0.1 percent to about 5.0 percent, preferably from about 0.1 percent to about 3.0 percent, based on the weight of the catalytic component (wt. %; dry basis).

The isomerization and dehydrogenation function, on the other hand, can be supplied by an isomerization catalyst. Thus, the isomerization component of the catalyst is comprised of an amorphous acidic material; an isomerization catalyst comprised of an acidic support composited with a catalytically active metal, preferably a Group VIII noble metal of the Periodic Table, suitably ruthenium, rhodium, palladium, osmium, iridium and platinum which can supply the isomerization and dehydrogenation functions. The isomerization catalyst component can thus be an isomerization catalyst such as those comprising a refractory metal oxide support base (e.g., alumina, silica-alumina, zirconia, titanium, etc.) on which is deposited a catalytically active metal selected from the group consisting of Group VIB, Group VIIB, Group VIII metals and mixtures thereof, preferably Group VIII metals, more preferably noble Group VIII metals, most preferably platinum or palladium and optionally including a promoter or dopant such as halogen, phosphorus, boron, yttria, magnesia, etc. preferably halogen, yttria or magnesia, most preferably fluorine. The catalytically active metals are present in the range of from about 0.1 to about 5.0 wt. %, preferably from about 0.1 to about 2.0 wt. %. The promoters and dopants are used to control the acidity of the isomerization catalyst. Thus, when the isomerization catalyst employs a base material such as alumina, acidity is imparted to the resultant catalyst by addition of a halogen, preferably fluorine. When a halogen is used, preferably fluorine, it is present in an amount in the range of about 0.1 to about 10 wt. %, preferably about 0.1 to about 3 wt. %, more preferably from about 0.1 to about 2 wt. % most preferably from about 0.5 to about 1.5 wt. %. Similarly, if silica-alumina is used as the base material, acidity can be controlled by adjusting the ratio of silica to alumina or by adding a dopant such as yttria or magnesia which reduces the acidity of the silica-alumina base material as taught in U.S. Pat. No. 5,254,518 (Soled, McVicker, Gates, Miseo). One or more isomerization catalysts can be pulverized and powdered, and mixed to provide two of the necessary components of the unitized mixed pellet catalyst.

Dewaxing is preferably carried out in the catalyst dewaxing unit in a slurry phase, or phase wherein the catalyst is dispersed throughout and movable within a liquid paraffinic hydrocarbon oil. The 700° F.+ feed is passed, with hydrogen, into the catalyst dewaxing unit and reaction carried out at catalytic dewaxing conditions tabulated as follows:

| Major Operating Variable | Typical | Preferred |
| --- | --- | --- |
| Temperature, ° F. (° C.) | 300–840 (148–448) | 500–752 (260–400) |
| Pressure, psig | 300–10,000 | 500–1500 |
| Hydrogen Treat Rate, SCF/B | 500–5000 | 1000–4000 |

The product of the catalyst dewaxing unit is generally a fully converted dewaxed lube oil blending component, or lube oil having viscosity indexes ranging above about 110, and lube pour point below about −15° C.

The invention, and its mode of operation will be better understood by reference to the following examples, and demonstrations which illustrate specific and preferred embodiments. All parts are in terms of weight units except as otherwise specified.

The following data shows that sulfur can be effectively removed from a titania supported cobalt catalyst by the combination of air oxidation and either hot or cold water washing steps without loss of cobalt from the catalyst. The data show, in marked contrast, that cobalt is lost from a silica supported cobalt catalyst, similarly treated.

EXAMPLES

Preparation of a Sulfided Catalyst:

For comparative purposes, a sample of fresh Co-Re/$TiO_2$ catalyst (nominally 11.5 wt. % Co, 1.25 wt. % Re on $TiO_2$ support) was prepared, and analyzed for cobalt and sulfur content by atomic adsorption spectroscopy. The analysis showed: 11.5±0.2 wt. % cobalt and 0.005±0.001 wt. % sulfur.

The high concentration hydrogen sulfide gas used for sulfiding the catalyst was produced by acid evolution from an alkali metal sulfide salt. The evolved $H_2S$ was collected in a dry ice cooled trap and purified by distillation from this trap to a second dry ice cooled trap. The second trap was provided with graduations so the quantity of liquid $H_2S$ could be determined. The liquid $H_2S$ in the second trap was vaporized and collected in a 1 liter glass bulb equipped with a pressure indicator. The quantity of $H_2S$ gas in the bulb was determined from the measured pressure, temperature (ambient), and the known volume of the bulb.

The unreduced catalyst, 20 gm (11.5 wt. % Co, 1.25 wt. % Re on $TiO_2$ support), was placed in a Schlenk tube for sulfiding. The tube was evacuated for about 1 hour at ambient temperature. Then the tube was filled with 45 ml of $H_2S$ at 273 mm Hg pressure from the 1 liter bulb. This gives approximately 1000 ppm by weight of sulfur on the catalyst. The tube was then heated over 20 minutes to 350° C. This caused reaction of the $H_2S$ with the catalyst. The temperature was held for 10 minutes and then the tube was cooled to room temperature. After cooling, a vacuum was observed in the tube, indicating reaction of the $H_2S$ with the catalyst. The tube was then flushed with air. No $H_2S$ could be detected in the flushing air. Analysis of the sulfided catalyst (atomic adsorption) showed 0.10±0.01 wt. % sulfur, confirming that all of the $H_2S$ had reacted with the catalyst. The cobalt content of the sulfided catalyst, by atomic adsorption spectroscopy was equivalent to the starting catalyst (11.5% wt. %±0.2 wt. %).

Regeneration of the Sulfided Catalysts

A. Oxidation of the Sulfided Catalyst:

A portion of the sulfided catalyst, 2 ml, was placed in a stainless steel U-tube reactor. Air was passed through the reactor and its temperature was raised quickly to 500° C. by placing it in a preheated oven. The reactor was held at 500° C. for one hour, then was removed from the oven and allowed to cool.

B. Water Extraction of Oxidized Sulfided Catalyst, with Hot and Cold Water, Respectively:

(a) A first portion of the oxidized sulfided catalyst was placed in a flask with 90 ml of water. The water was heated to boiling with stirring. The catalyst-water suspension was boiled for 10 minutes with stirring. The water was then decanted and another aliquot of 90 ml of water was added and the extraction step was repeated. This was repeated once more, giving a total of three extractions with 90 ml of boiling water. The decanted water from all three extractions was colorless, indicating no loss of cobalt metal had occurred. After the third extraction the catalyst was recovered by filtration and rinsed with about 500 ml of cold water. The catalyst was then dried on the filter by drawing air through the filter cake. The catalyst was then transferred to a cup and further dried on a steam bath with stirring. The cobalt and sulfur content of the washed catalyst was determined by atomic adsorption spectroscopy. The results were: 11.6±0.2 wt. % cobalt and 0.016±0.002 wt. % sulfur. This shows that 89% of the added sulfur was removed with no loss of cobalt.

(b) A second portion of the oxidized sulfided catalyst was placed in a flask with 90 ml of water at ambient temperature. The suspension of water and catalyst was stirred overnight. The water was then decanted and another aliquot of 90 ml of water was added, and these steps repeated. This was repeated once more, giving a total of three extractions with 90 ml of water. The decanted water from all three extractions was colorless, indicating no loss of cobalt metal had occurred. After the third extraction the catalyst was recovered by filtration and rinsed with about 500 ml of cold water. The catalyst was then dried on the filter by drawing air through the filter cake. The catalyst was then transferred to a cup and further dried on a steam bath with stirring. The cobalt and sulfur content of the washed catalyst was determined by atomic adsorption spectroscopy. The results: 11.3±0.2 wt. % cobalt and 0.019±0.002 wt. % sulfur. This showed that 86% of the added sulfur was removed and there was no loss of cobalt.

A portion of the oxidized, but not sulfided, catalyst which had been hot water extracted as described in (a) was analyzed by atomic adsorption spectroscopy demonstrating that the specimen contained: 11.5±0.2 wt. % Co and 0.005±0.001 wt. % sulfur; this showing no change from the fresh catalyst.

Comparative Demonstration:

For purposes of comparison, samples of catalyst constituted of 10 wt. % cobalt supported on $SiO_2$ were sulfided, oxidized, and washed according to the foregoing procedures. For both hot water and cold water the decanted wash water aliquots had a pink color, indicating loss of cobalt from the catalyst. This is in marked contrast to the 11.5 wt. % Co, 1.25 wt. % Re and $TiO_2$ support catalyst, where no cobalt loss was observed.

From these data it is clear that sulfur can be removed from a sulfided cobalt titania supported catalyst by the air oxidation and hot or cold water washing steps without loss of cobalt by the catalyst. This differs sharply from a sulfided cobalt silica supported catalyst wherein significant cobalt loss is encountered during the sulfur extractions with either hot or cold water.

The hydrocarbons produced by a hydrocarbon synthesis process according to the invention are typically upgraded to more valuable products, by subjecting all or a portion of the $C_5$+ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

Having described the invention, what is claimed is:

1. A process for reactivating a sulfur deactivated titania supported cobalt, hydrocarbon synthesis catalyst having a sulfur component comprising:

(a) oxidizing the sulfur component of the sulfur deactivated catalyst, (b) washing the sulfur oxidized catalyst, and (c) reducing and activating the washed catalyst by treating the washed catalyst with hydrogen or a hydrogen containing gas.

2. The process of claim 1 wherein oxidation is effected by contacting the sulfur deactivated catalyst with molecular oxygen at a temperature ranging from about 150° C. to about 600° C.

3. The process of claim 1 wherein step (b) is effected with water.

4. The process of claim 1 wherein step (c) is effected at a temperature ranging from about 250° to about 550° C.

5. The process of claim 1 wherein the cobalt is present in an amount ranging from about 2–70 wt %, the titania is present in an amount of at least about 30 wt %, and the washing is effected with liquid water at a temperature ranging from about 0° to 100° C.

6. The process of claim 5 wherein the cobalt is present in an amount ranging from about 10–30 wt %, and the washing occurs at a temperature of about 20–80° C.

7. The process of claim 5 wherein the catalyst contains a promoter.

8. The process of claim 7 wherein the promoter is selected from the group consisting of rhenium, cerium, hafnium, and uranium, and is present in a weight ratio of promoter:cobalt of about 0.1:1 to 1:1.

9. The process of claim 8 wherein the promoter is rhenium.

* * * * *